US012055120B2

(12) United States Patent
Kondo

(10) Patent No.: US 12,055,120 B2
(45) Date of Patent: Aug. 6, 2024

(54) IGNITION COIL AND IGNITION DEVICE EQUIPPED WITH THE SAME FOR INTERNAL COMBUSTION ENGINE

(71) Applicant: DENSO CORPORATION, Kariya (JP)

(72) Inventor: Yuki Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/194,958

(22) Filed: Apr. 3, 2023

(65) Prior Publication Data

US 2023/0313773 A1 Oct. 5, 2023

(30) Foreign Application Priority Data

Apr. 4, 2022 (JP) ................................ 2022-062253

(51) Int. Cl.
*F02P 3/02* (2006.01)
*H01F 38/12* (2006.01)

(52) U.S. Cl.
CPC ................ *F02P 3/02* (2013.01); *H01F 38/12* (2013.01)

(58) Field of Classification Search
CPC .................................. F02P 3/02; H01F 38/12
See application file for complete search history.

(56) References Cited

U.S. PATENT DOCUMENTS

2008/0024258 A1* 1/2008 Nakao .................... H01F 38/12 336/107

FOREIGN PATENT DOCUMENTS

JP 2011-190767 9/2011
JP 6686307 4/2020

* cited by examiner

*Primary Examiner* — Jacob M Amick
(74) *Attorney, Agent, or Firm* — Nixon & Vanderhye P.C.

(57) ABSTRACT

An ignition coil includes a coil unit, a hollow cylindrical joint, and a spring. The joint couples the coil unit with a spark plug. The spring is inserted into a through-hole in the joint to electrically connect the coil unit and the spark plug together. The joint has electrical insulation and rubber elasticity. The spring includes a spring base section, a spring head section, and a spring intermediate section lying between the spring base and head sections. The joint has an inner peripheral surface placed in direct contact with the spring intermediate section in a radial direction of the joint. The spring intermediate section is wound more densely than each of the spring base section and the spring head section in a condition where the spring is subjected to no load. This structure serves to minimize a risk of generation of a corona discharge in the ignition coil and an ignition device equipped with the ignition coil and improve the productivity thereof.

8 Claims, 7 Drawing Sheets

IGNITION COIL AND IGNITION DEVICE EQUIPPED WITH THE SAME FOR INTERNAL COMBUSTION ENGINE

CROSS REFERENCE TO RELATED DOCUMENT

The present application claims the benefit of priority of Japanese Patent Application No. 2022-062253 filed on Apr. 4, 2022, the disclosure of which is incorporated in its entirety herein by reference.

BACKGROUND

1 Technical Field

This disclosure relates generally to an ignition coil and an ignition device equipped with the same for an internal combustion engine.

2 Background Art

Japanese Patent No. 6686307 discloses an ignition coil which includes a joint which joins a coil unit and a spark plug together and a spring which electrically connects between the coil body and the spark plug. The ignition coil is designed to embed a portion of the spring in the joint in order to eliminate a risk that an air layer may be created between the joint and the spring to avoid the occurrence of a corona discharge between the joint and the spring.

In the above ignition coil, the embedding of the portion of the spring in the joint is achieved using insert moulding techniques. This requires the need to arrange the spring in place within a mold and also to prepare the mold designed with precision high enough to avoid the leakage of resin therefrom. There is, therefore, left room for improvement of production of the ignition coil.

SUMMARY

It is an object of this disclosure to provide an ignition coil for use in internal combustion engines which is capable of minimizing a risk of generation of a corona discharge and designed to improve production thereof and also provide an ignition device equipped with such an ignition coil.

According to one aspect of this disclosure, there is provided an ignition coil for an internal combustion engine which comprises (a) a coil unit which works to generate a high voltage; (b) a cylindrical joint which achieves a mechanical joint of the coil unit and a spark plug and has a through-hole formed therein; and (c) a spring which is disposed inside the through-hole of the joint and achieves an electrical connection of the coil unit and the spark plug. The joint has electrical insulation and elasticity. The spring has a length which extends in a through-hole lengthwise direction of the through-hole and includes a spring base section, a spring head section, and a spring intermediate section located between the spring base section and the spring head section. The spring base section lies on a base side of the length of the spring and electrically connecting with the coil unit. The spring head section lies on a head side of the length of the spring opposed to the base side in the through-hole lengthwise direction and electrically connects with the spark plug. The joint has an inner peripheral surface placed in direct contact with the spring intermediate section in a radial direction thereof. The spring is made of a spiral winding of a conductor and has the spring intermediate section wound more densely than the spring base section and the spring head section when the spring is subjected to no load.

According to another aspect of this disclosure, there is provided an ignition device which comprises: (a) a spark plug; and (b) an ignition coil working to apply a high voltage to the spark plug. The ignition coil includes a coil unit, a cylindrical joint, and a spring. The coil unit works to generate the high voltage. The joint connects the coil unit and the spark plug together. The spring is disposed inside a through-hole formed in the joint and electrically connects the coil unit and the spark plug together. The joint has electrical insulation and elasticity. The spring has a length which extends in a through-hole lengthwise direction of the through-hole and includes a spring base section, a spring head section, and a spring intermediate section located between the spring base section and the spring head section. The spring base section les on a base side of the length of the spring and electrically connects with the coil unit. The spring head section lies on a head side of the length of the spring opposed to the base side in the through-hole lengthwise direction and electrically connects with the spark plug. The joint has an inner peripheral surface placed in direct contact with the spring intermediate section in a radial direction thereof. The spring is made of a spiral winding of a conductor and has the spring intermediate section wound more densely than the spring base section and the spring head section when the spring is subjected to no load.

In the above structure of the ignition coil, the inner peripheral surface of the joint and the spring intermediate section are placed in direct contact with each other in the radial direction. This minimizes a risk that an air layer may be created between the joint and the spring intermediate section, which reduces the possibility that a corona discharge will be generated between the joint and the spring intermediate section.

The joint of the ignition coil has physical elasticity, such as rubber elasticity. The spring is designed to have the spring intermediate section wound more densely than each of the spring base section and the spring head section when the spring is subjected to no load. This facilitates the ease with which the spring is inserted into the through-hole of the joint when the ignition coil is assembled, thereby improving the productivity of the ignition coil.

The above ignition device is equipped with the above structure of the ignition coil, thus minimizing the risk of generation of a corona discharge therein and assuring improvement of productivity of the ignition device.

As apparent from the above discussion, the above structures of the ignition coil and the ignition device are capable of reducing the probability of generation of a corona discharge therein and improving the productivity thereof.

Reference marks or numbers in parentheses are attached to elements described in this application. Such reference marks or numbers merely represent an example of a correspondence relation between the elements and parts in the following embodiments. This disclosure is, therefore, not limited to the embodiments by use of the reference marks or numbers.

BRIEF DESCRIPTION OF THE DRAWINGS

The present disclosure will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

First Embodiment

The ignition coil 1 and the ignition device 10 equipped with the ignition coil 1 according to the first embodiment will be described below with reference to FIGS. 1 to 9.

Figure 1:
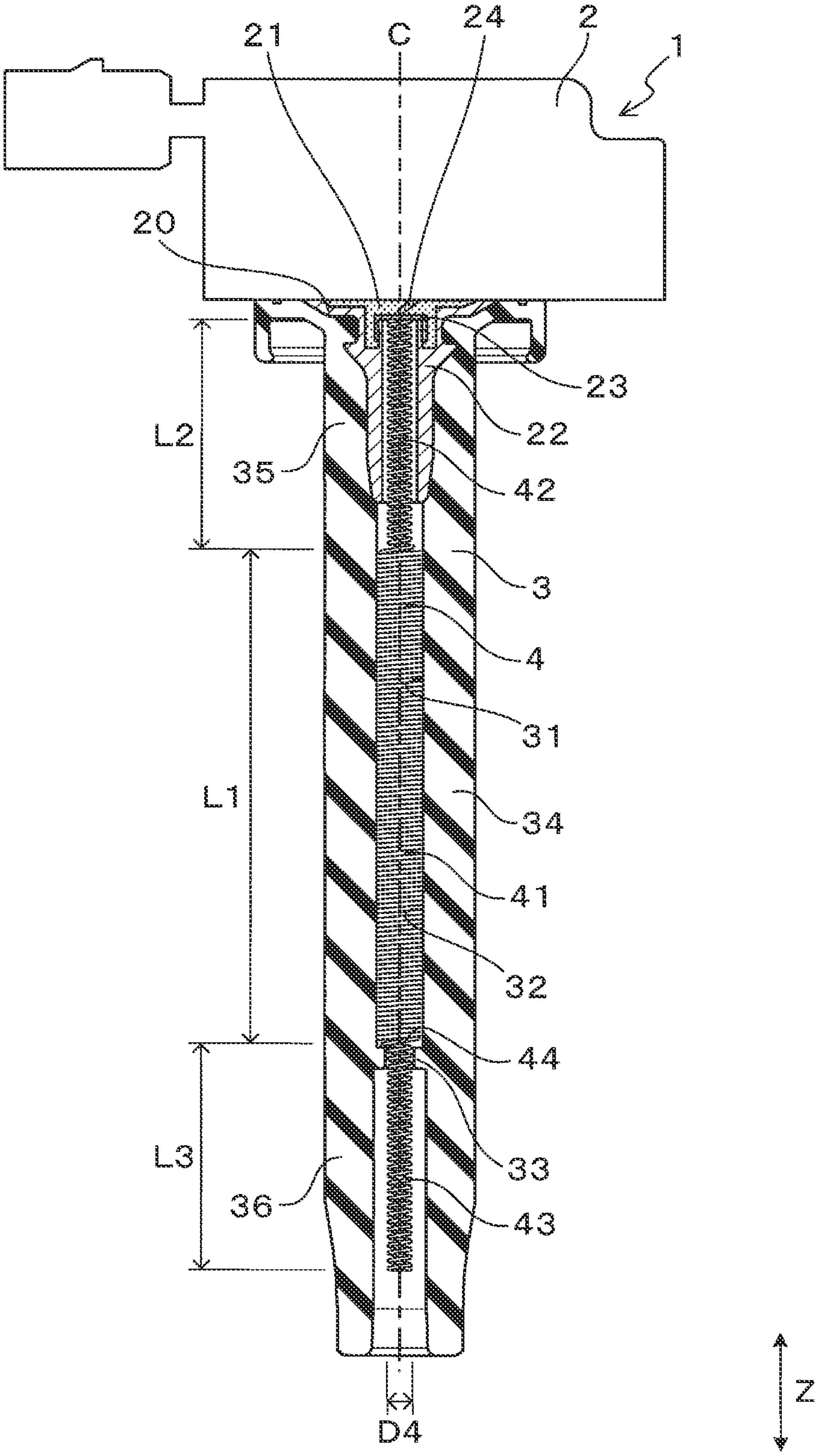
FIG. 1 is a sectional view which illustrates a structure of an ignition coil, as taken in a through-hole lengthwise direction according to the first embodiment.

The ignition coil 1 for use with internal combustion engine in this embodiment, as illustrated in FIG. 1, includes the coil unit 2, the cylindrical joint 3, and the spring 4. The coil unit 2 works to generate a high voltage. The joint 3, as clearly illustrated in FIG. 8, couples the coil unit 2 and the spark plug 100 together. The spring 4 is inserted into the through-hole 31 formed in the joint 3 to achieve an electrical connection between the coil unit 2 and the spark plug 100. The joint 3 has electrical insulation properties and rubber elasticity.

The spring 4 is designed to have a given length which extends in a lengthwise direction of the through-hole 31 and includes the spring base section 42, the spring head section 43, and the spring intermediate section 41. The spring base section 42 is arranged in a base portion of the through-hole 31 and extends in a direction in which the through-hole 31 extends (which will also be referred to below as the through-hole lengthwise direction Z). The spring base section 42 electrically connects with the coil unit 2. The spring head section 43 is arranged in a head portion of the through-hole lengthwise direction Z and electrically connects with the spark plug 100. The spring intermediate section 41 is arranged, in other words, connects between the spring base section 42 and the spring head section 43. The joint 3 has the inner peripheral surface 32 which faces the spring intermediate section 41 in the radial direction of the joint 3 in direct contact therewith.

The spring 4 is made of a spirally wound conductor. The spring 4 is, as can be seen in FIGS. 2 to 5, wound more densely in the spring intermediate section 41 than in the spring base section 42 and the spring head section 43 when the spring 4 is subjected to no load.

Figure 8:
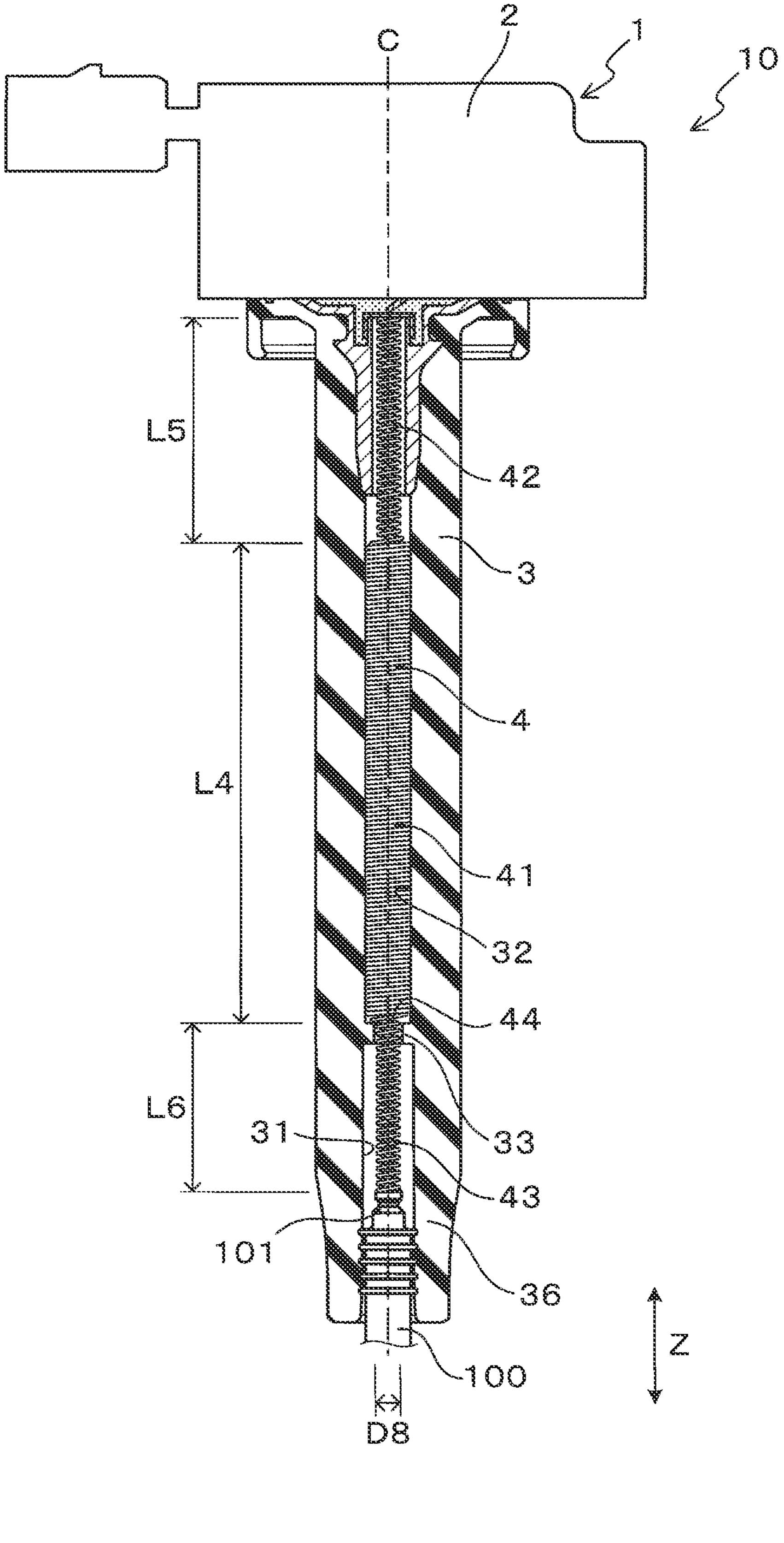
FIG. 8 is a sectional view of an ignition device, as taken in a through-hole lengthwise direction in the first embodiment.
Figure 9:
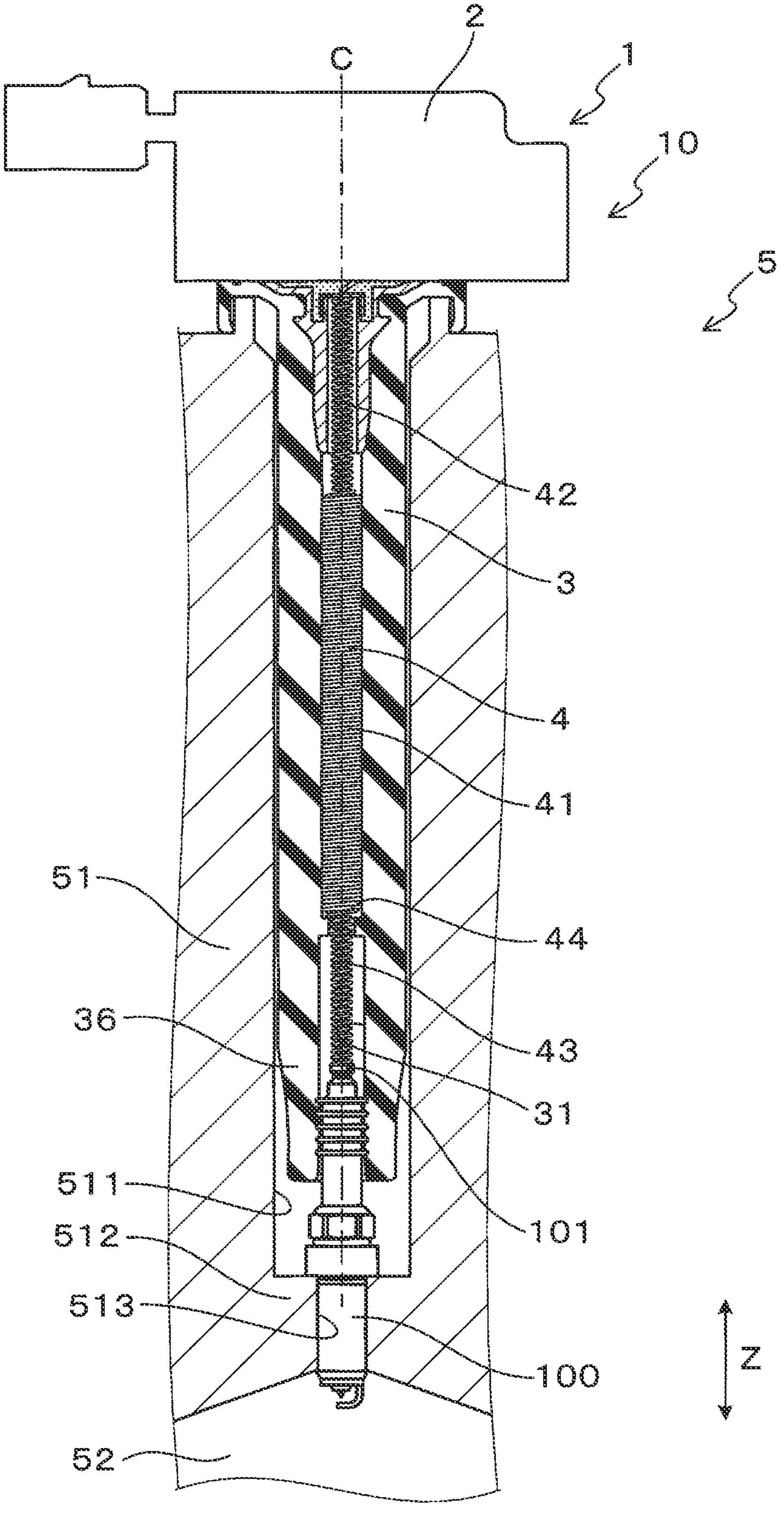
FIG. 9 is a sectional view which illustrates an internal combustion engine in which an ignition device is installed in the first embodiment.

In use, the ignition coil 1 may be connected to a spark plug installed in an internal combustion engine mounted in an automotive vehicle to apply a high voltage to the spark plug. In this disclosure, a portion of the ignition coil 1 which connects with or is located closer to the spark plug 100 will also be referred to below as a base side or a base end side, while a portion of the ignition coil 1 which is opposed to the base side in the through-hole lengthwise direction Z of the through-hole 31 will also be referred to below as a head side or a head end side. The same is true for the spring 4 and the joint 3. The radial direction, as referred to below, represents a radial direction of a circle centered at the center axis C of the joint 3 on a plane defined to extend perpendicular to the center axis C of the joint 3 unless otherwise specified. The circumferential direction, as referred to below, represents a direction in which the circumference of the circle centered at the center axis C of the joint 3 extends. FIGS. 1, 8, and 9 omit details of a portion of the coil unit 2 located closer to the base end than the joint 3 is.

The coil unit 2, as illustrated in FIG. 1, has a primary coil, not shown, and a secondary coil, not shown, which are magnetically coupled with each other and disposed in the case 20. The primary coil and the secondary coil are hermetically sealed by the resin seal 21 with which the case 20 is filled.

The coil unit 2 also includes the hollow cylindrical tower 22 protruding from the case 20 toward the head side of the ignition coil 1. The tower 22 has the high-voltage output terminal 23 fit thereon to close the base end of the tower 22.

The coupling of the coil unit 2 with the joint 3 is achieved by fitting the tower 22 in the through-hole 31. The spring base section 42 is inserted into the tower 22. The spring base section 42 is compressed in the through-hole lengthwise direction Z into direct contact with the high-voltage output terminal 23. In other words, the spring base section 42 is pressed against an end surface of the high-voltage output terminal 23 which faces the head side of the ignition coil 1. The spring 4 and the secondary coil are electrically connected through the high-voltage output terminal 23 and the connecting terminal 24.

Figure 2:
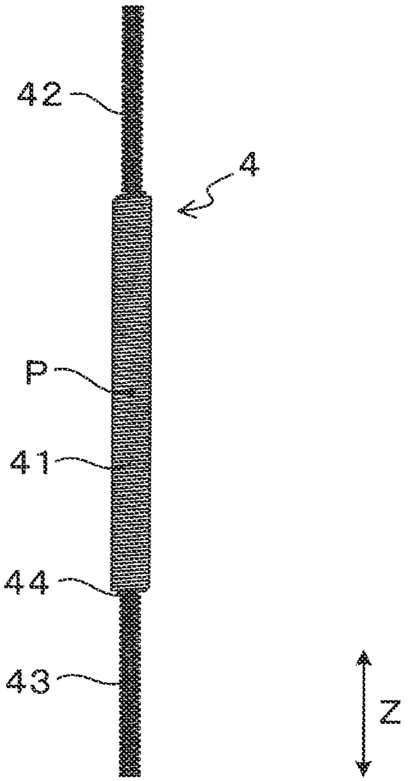
FIG. 2 is an illustration of a spring subjected to no load, as viewed in a direction perpendicular to a through-hole lengthwise direction in the first embodiment.

The spring 4 is shaped to have a length extending in the through-hole lengthwise direction Z and made of a single conductor winding. The spring base section 42 and the spring head section 43 are, as illustrated in FIG. 2, shaped to be symmetric with respect to the center P of the length of the spring 4 when the spring 4 subjected to no load is viewed in a direction perpendicular to the through-hole lengthwise direction Z. In other words, the spring base section 42 is substantially identical in length in the through-hole lengthwise direction Z with the spring head section 43 when the spring 4 is subjected to no load.

The spring intermediate section 41, as can be seen in FIG. 1, has the length L1 in the through-hole lengthwise direction Z which is larger than the sum of the length L2 of the spring base section 42 in the through-hole lengthwise direction Z and the length L3 of the spring head section 43 in the through-hole lengthwise direction Z. The lengths L1, L2, and L3, as referred to herein, are dimensions of the spring intermediate section 41, the spring base section 42, and the spring head section 43 in the through-hole lengthwise direction Z when the joint 3 and the coil unit 2 are coupled together. The length L2 is, therefore, given by the length of the spring base section 42 when compressed in the through-hole lengthwise direction Z.

Figure 3:
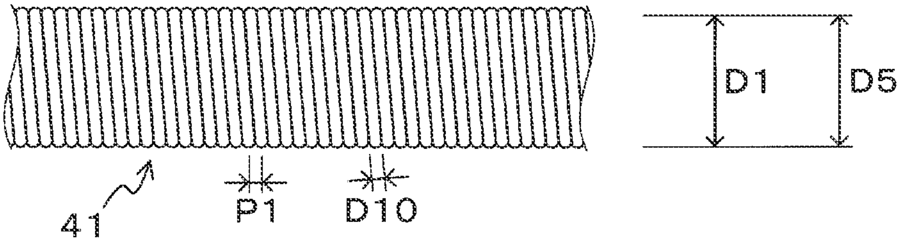
FIG. 3 is an enlarged view of a spring intermediate section in the first embodiment.
Figure 4:
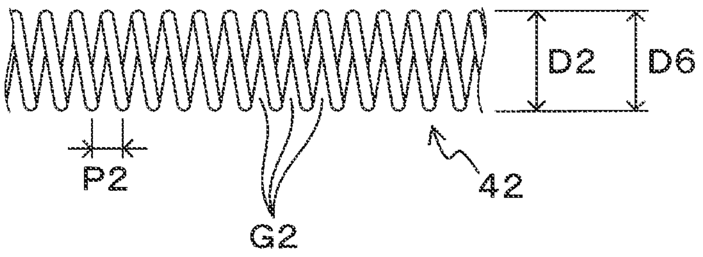
FIG. 4 is an enlarged view of a spring base section in the first embodiment.
Figure 5:
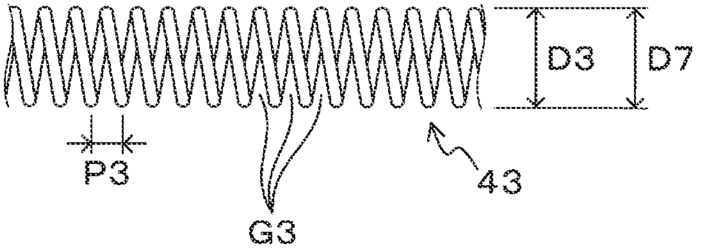
FIG. 5 is an enlarged view of a spring head section in the first embodiment.

The spring intermediate section 41, as illustrated in FIG. 3, has the outer diameter D1 which is larger than each of the outer diameter D2 of the spring base section 42 illustrated in FIG. 4 and the outer diameter D3 of the spring head section 43 illustrated in FIG. 5.

The spring intermediate section 41 is configured to have the pitch P1 that is, as can be seen in FIG. 3, an interval between a respective adjacent two of turns thereof. The pitch P1 is selected to be smaller than each of the pitch P2 of the spring base section 42 illustrated in FIG. 4 and the pitch P3 of the spring head section 43 illustrated in FIG. 5 when the spring 4 is subjected to no load. In other words, when the spring 4 is subjected to no load, the number of turns of the spring intermediate section 41 per unit length in the through-hole lengthwise direction Z is larger than that of each of the spring base section 42 and the spring head section 43. To say it in different way, the spring intermediate section 41 is wound more densely than the spring base section 42 and the spring head section 43 when the spring 4 is subjected to no load.

In this embodiment, the pitch P1 is, as illustrated in FIG. 3, identical with the diameter D10 of the conductor by which the spring intermediate section 41 is made. The spring intermediate section 41 is, therefore, made up of turns of the conductor which are arranged adjacent to each other in the through-hole lengthwise direction Z and a respective adjacent two of which are in direct contact with each other.

The spring base section 42 is, as clearly illustrated in FIG. 4, made up of turns of the conductor a respective adjacent two of which are arranged away from each other through the air gap G2 in the through-hole lengthwise direction Z. Similarly, the spring head section 43 is, as illustrated in FIG. 5, made up of turns of the conductors a respective adjacent two of which are arranged away from each other through the air gap G3 in the through-hole lengthwise direction Z.

Referring back to FIG. 1, the joint 3 includes the connecting intermediate section 34, the connecting base section 35, and the connecting head section 36. The connecting intermediate section 34 faces the spring intermediate section 41 in the radial direction. The connecting base section 35 is located closer to the base side of the ignition coil 1 than the spring intermediate section 41 is. The connecting head section 36 is located closer to the head side of the ignition coil 1 than the spring intermediate section 41 is. The spring intermediate section 41 has a length the whole of which is in close contact with the inner peripheral surface 32 of the connecting intermediate section 34. The spring intermediate section 41 also has a circumference the whole of which is in close contact with the inner peripheral surface 32 of the connecting intermediate section 34. The joint 3 is made from, for example, elastomer. Specifically, the joint 3 is made from silicone rubber.

Figure 6:
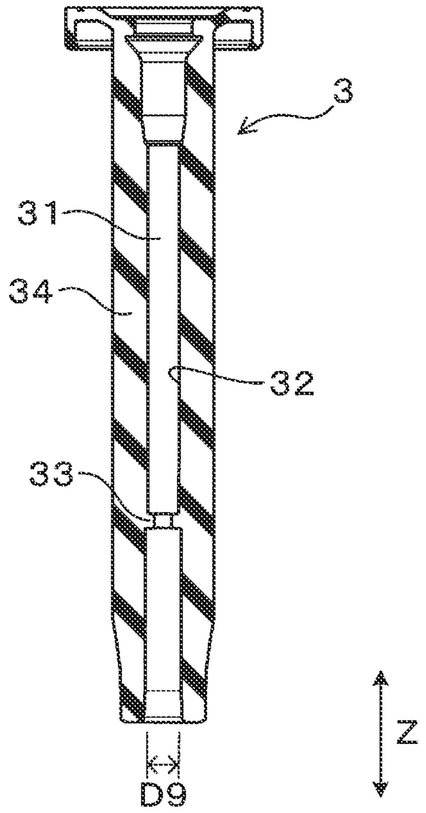
FIG. 6 is a sectional view of a joint, as taken in a through-hole lengthwise direction in the first embodiment.
Figure 7:
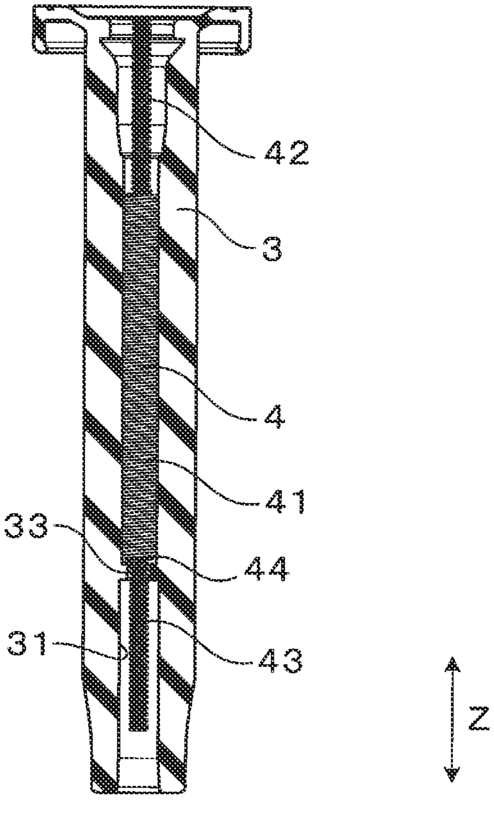
FIG. 7 is a sectional view of a joint with a spring inserted into a through-hole formed in the joint in the first embodiment.

The joint 3 is, as clearly illustrated in FIGS. 1, 6, and 7, equipped with the positioner 33. The positioner 33 is implemented by an annular protrusion which is formed on the inner peripheral surface 32 in the shape of an inner shoulder and extends in the circumferential direction of the inner peripheral surface 32. The positioner 33, as can be seen in FIG. 1, has the inner diameter D4 which is smaller than the outer diameter D1 (see FIG. 3) and larger than the outer diameter D3 (see FIG. 5). The spring head section 43 is disposed inside the positioner 33.

The spring 4 is disposed in the through-hole 31 with the boundary 44 facing the positioner 33 in direct contact with the positioner 33. The boundary 44 is a boundary between the spring intermediate section 41 and the spring head section 43.

How to assemble the ignition coil 1 will be described below.

First, the spring 4 is press-fitted into the through-hole 31 of the joint 3 from the base side toward the head side until the boundary 44 of the spring 4 contacts with the positioner 33 in the through-hole lengthwise direction Z. This fixes the spring 4, as illustrated in FIG. 7, at a required location within the joint 3. Afterwards, the tower 22 of the coil unit 2 is, as illustrated in FIG. 1, fitted into the through-hole 31 from the base side to bring the spring base section 42 and the high-voltage output terminal 23 into contact with each other in the through-hole lengthwise direction Z. This completes the ignition coil 1. The fitting of the tower 22 in the through-hole 31 achieves the compression of the spring base section 42 in the through-hole lengthwise direction Z.

Before the spring 4 is inserted into the through-hole 31, the inner diameter D9 of the connecting intermediate section 34 is, as can be seen in FIG. 6, less than or equal to the outer diameter D1 (see FIG. 3). Each of the outer diameter D2 (see FIG. 4), the outer diameter D3 (see FIG. 5), and the inner diameter D4 (see FIG. 1) is also smaller than the inner diameter D9.

The ignition device 10 in this embodiment will be described below.

The ignition device 10 for use in an internal combustion engine, as illustrated in FIGS. 8 and 9, includes the spark plug 100 and the ignition coil 1 working to apply high-voltage to the spark plug 100.

The spring intermediate section 41, as illustrated in FIG. 8, has the length L4 extending in the through-hole lengthwise direction Z. The length L4 is longer than the sum of the length L5 of the spring base section 42 in the through-hole lengthwise direction Z and the length L6 of the spring head section 43 in the through-hole lengthwise direction Z. The lengths L4, L5, and L6, as referred to herein, are dimensions of the spring intermediate section 41, the spring base section 42, and the spring head section 43 in the through-hole lengthwise direction Z when the joint 3 is coupled with the coil unit 2 and the spark plug 100. In other words, the length L5 is a length of the spring base section 42 when compressed in the through-hole lengthwise direction Z. The length L6 is a length of the spring head section 43 when compressed, as will be described later, by the spark plug 100 in the through-hole lengthwise direction Z.

The spring intermediate section 41, as illustrated in FIG. 3, has the outer diameter D5 which is larger than the outer diameter D6 of the spring base section 42 in FIG. 4 and the outer diameter D7 of the spring head section 43 in FIG. 5.

The positioner 33, as illustrated in FIG. 8, has the outer diameter D8 which is smaller than the outer diameter D5 and larger than the outer diameter D7. The spring head section 43 is inserted into the positioner 33.

The ignition device 10 in this embodiment is, as illustrated in FIG. 9, mounted in the internal combustion engine 5. The engine head 51 of the internal combustion engine 5 has formed therein the plug hole 511 in which the joint 3 of the ignition coil 1 is fit. The plug hole 511 has an opening oriented toward the base side of the ignition coil 1 and also has a base end closed by the blocking wall 512. The blocking wall 512 has formed therein the female screw hole 513 into which the spark plug 100 is screwed. The attachment of the spark plug 100 to the engine head 51 is achieved by fastening the spark plug 100 in the female screw hole 513. When the spark plug 100 is mounted in the engine head 51, the spark plug 100 will have a tip exposed to the combustion chamber 52 of the internal combustion engine 5.

After the spark plug 100 is mounted in the internal combustion engine 5, the ignition coil 1 is installed in the internal combustion engine 5. Specifically, the spark plug 100 is first mounted in the engine head 51. Subsequently, the joint 3 is inserted into the plug hole 511 form the base side thereof. The spark plug 100 is fitted into the connecting head section 36 from the head side thereof. This achieves coupling of the coil unit 2 and the spark plug 100 through the joint 3. Upon the fitting of the spark plug 100 into the connecting head section 36, the spring head section 43 is pressed in the through-hole lengthwise direction Z by the metallic terminal 101 of the spark plug 100. This causes the spring head section 43 to be compressed in the through-hole lengthwise direction Z in contact with the terminal 101. The spring head section 43 is, therefore, pressed against the terminal 101 in contact therewith, thereby achieving an electrical connection with the spark plug 100.

This embodiment offers the following beneficial advantages.

In the ignition coil 1, the inner peripheral surface 32 of the joint 3 and the spring intermediate section 41 are placed in direct contact with each other in the radial direction. This minimizes a risk that an air layer may be created between the joint 3 and the spring intermediate section 41, which reduces the possibility that a corona discharge will be generated between the joint 3 and the spring intermediate section 41.

The joint 3 of the ignition coil 1 has rubber elasticity. The spring 4 is designed to have the spring intermediate section 41 wound more densely than each of the spring base section 42 and the spring head section 43 when the spring 4 is subjected to no load. This facilitates the ease with which the spring 4 is inserted into the through-hole 31 of the joint 3 when the ignition coil 1 is assembled, thereby improving the productivity of the ignition coil 1.

The spring intermediate section 41 of the spring 4 is, as described above, wound more densely than the spring base section 42 and the spring head section 43 when the spring 4 is subjected to no load. This results in an increase in rigidity of the spring intermediate section 41 in the through-hole lengthwise direction Z. The joint 3 has rubber elasticity, thereby enabling the spring 4 to be press-fitted into the through-hole 31 in the through-hole lengthwise direction Z with minimized bending of the spring 4 when the ignition coil 1 is assembled. This enables the inner peripheral surface 32 of the joint 3 and the spring intermediate section 41 to be placed in close contact with each other without use of any parts other than the joint 3 and the spring 4, thereby resulting in a decrease in production cost for the ignition coil 1 capable of minimizing the risk of generation of the corona discharge. This enhances the output performance of the ignition coil 1 for the spark plug 100 and also improves the productivity of the ignition coil 1.

The length L1 (see FIG. 1) is, as described above, selected to be larger than the sum of the length L2 (see FIG. 1) and the length L3 (see FIG. 1), thereby resulting in an increased area of contact between the spring 4 and the inner peripheral surface 32 of the joint 3. This also minimizes a risk that an air layer may be created between the joint 3 and the spring 4, which reduces the probability of occurrence of a corona discharge between the joint 3 and the spring 4.

The spring base section 42 and the spring head section 43 are, as described already, shaped to be point-symmetric with respect to the center P of the length of the spring 4 when the spring 4 subjected to no load is viewed in a direction perpendicular to the through-hole lengthwise direction Z. This enables the spring 4 to be inserted into the through-hole 31 of the joint 3 without having to pay attention to orientation of the spring 4 when the ignition coil 1 is assembled. Specifically, end portions of the spring 4 which are opposed to each other in the through-hole lengthwise direction Z, and whichever is first inserted into the through-hole 31 will serve as the spring head section 43. In other words, either one of the end portions of the spring 4 may be first fitted into the through-hole 31 to work as the spring head section 43 made of a winding which has a given length and a given pitch between a respective adjacent two of the turns of the winding. This enhances the efficiency in assembling the ignition coil 1, thus resulting in improvement of productivity of the ignition coil 1.

The spring intermediate section 41 is, as described above, designed to have the outer diameter D1 (see FIG. 3) which is larger than each of the outer diameter D2 of the spring base section 42 illustrated in FIG. 4 and the outer diameter D3 of the spring head section 43 illustrated in FIG. 5. This enables the spring 4 to be press-fitted into the through-hole 31 of the joint 3 without having to pay attention to the stiffness of the spring head section 43 in the through-hole lengthwise direction Z when the ignition coil 1 is assembled, thereby facilitating the ease with which the outer periphery of the spring intermediate section 41 is placed in close contact with the inner peripheral surface 32 of the joint 3. This enhances the productivity of the ignition coil 1 and also facilitates close contact of the spring intermediate section 41 with the inner peripheral surface 32 of the joint 3 without sacrificing the spring properties of the spring base section 42 and the spring head section 43.

The joint 3 is, as described above, equipped with the positioner 33. The inner diameter D4 of the positioner 33 is selected to be smaller than the outer diameter D1, but larger than the outer diameter D3. The spring head section 43 is disposed to pass inside the positioner 33. This facilitates positioning of the spring 4 relative to the joint 3 in the through-hole lengthwise direction Z when the ignition coil 1 is assembled. Specifically, the positioning of the spring 4 at a required location is achieved by inserting the spring 4 forward into the through-hole 31 the through-hole lengthwise direction Z until the boundary 44 on the spring 4 contacts with the positioner 33 when the ignition coil 1 is assembled, which enhances the productivity of the ignition coil 1. The joint 3 is shaped to have the positioner 33, thereby ensuring the stability in holding the spring 4 from being removed undesirably from the joint 3.

The spring 4 is arranged inside the through-hole 31 with the boundary 44 placed in direct contact with the positioner 33 in the through-hole lengthwise direction Z, thereby ensuring the stability in keeping the spring 4 at a required location relative to the joint 3. This assures the electrical connection between the coil unit 2 and the spring 4.

The ignition device 10 is equipped with the ignition coil 1, thereby minimizing a risk of occurrence of a corona discharge therein and improving the productivity of the ignition device 10.

The length L4 (see FIG. 8) is selected to be larger than the sum of the length L5 (see FIG. 8) and the length L6 (see FIG. 8), thereby resulting in an increased area of contact between the spring 4 and the inner peripheral surface 32 of the joint 3, which reduces the probability of generation of a corona discharge between the joint 3 and the spring 4.

The outer diameter D5 (see FIG. 3) is selected to be larger than each of the outer diameter D6 (see FIG. 4) and the outer diameter D7 (see FIG. 5), thereby facilitating insertion of the spring 4 into the through-hole 31 of the joint 3 without having to pay attention to the stiffness of the spring head section 43 in the through-hole lengthwise direction Z in assembling of the ignition coil 1. This ensures better improvement of the productivity of the ignition device 10 and also assures the close contact between the spring intermediate section 41 and the inner peripheral surface 32 of the joint 3 without sacrificing the spring properties of the spring base section 42 and the spring head section 43.

The inner diameter D8 of the positioner 33 is selected to be smaller than the outer diameter D5 of the spring intermediate section 41 and larger than the outer diameter D7 of the spring head section 43. The spring head section 43 is partially inserted into the positioner 33. This facilitates the ease with which the spring 4 is positioned relative to the joint 3 in the through-hole lengthwise direction Z in assembling of the ignition coil 1, thereby contributing the improvement of productivity of the ignition device 10. The positioner 33 is formed integrally on the joint 3, thereby minimizing a risk that the spring 4 may be undesirably dislodged from the joint 3.

The inner diameter D9 of the connecting intermediate section 34 of the joint 3 is set less than or equal to the outer diameter D1 of the spring intermediate section 41 before the spring 4 is inserted into the through-hole 31. This assures the close contact between the inner peripheral surface 32 of the joint 3 and the spring intermediate section 41 when the spring 4 is inserted into the joint 3, thereby resulting in a decrease in risk of generation of a corona discharge between the joint 3 and the spring intermediate section 41.

The spring intermediate section 41 of the spring 4 is, as described above, made of a conductor winding and shaped to have respective adjacent turns of the conductor winding which are placed in direct contact with each other in the through-hole lengthwise direction Z, thereby resulting in an increase in stiffness of the spring intermediate section 41 in the through-hole lengthwise direction Z, which facilitates the ease with which the spring 4 is inserted into the through-hole 31 in assembling of the ignition coil 1 and assures better improvement of productivity of the ignition device 10.

The spring base section 42 and the spring head section 43 are, as described above, configured to have the air gaps G2 and G3, respectively, so that the spring base section 42 and the spring head section 43 have required spring properties large enough to press the spring base section 42 against the high-voltage output terminal 23 and also press the spring head section 43 against the spark plug 100. This ensures the stability of electrical connection between the coil unit 2 and the spark plug 100.

As apparent from the above discussion, this embodiment provides the ignition coil 1 for internal combustion engines which is capable of minimizing the risk of generation of a corona discharge therein and easy to produce and the ignition device 10 equipped with the ignition coil 1.

Second Embodiment

Figure 10:
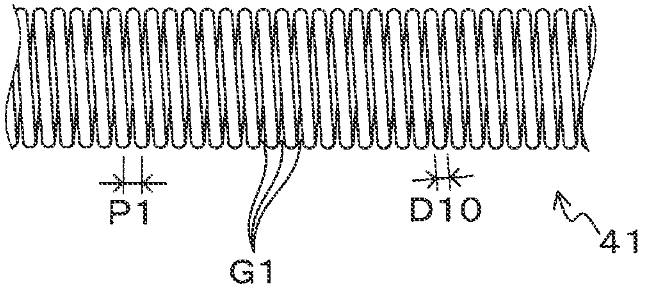
FIG. 10 is an enlarged view which illustrates a spring intermediate section of a spring mounted in an ignition coil according to the second embodiment.

This embodiment is, as illustrated in FIG. 10, designed to have an air gap G1 between a respective adjacent two of turns of the conductor winding of the spring intermediate section 41 of the spring 4.

Specifically, the spring intermediate section 41 is, as can be seen in FIG. 10, configured to have the air gaps G1 each of which lies between a respective adjacent two of the turns of the conductor winding and which are arranged in the through-hole lengthwise direction Z. Each of the air gaps G1 has a size in the through-hole lengthwise direction Z, i.e., an interval between the adjacent two turns of the conductor winding which is smaller than that of the air gaps G2 of the spring base section 42 (see FIG. 4) and that of the air gaps G3 of the spring head section 43 (see FIG. 5) in the through-hole lengthwise direction Z. It is preferable that the size of the air gaps G1 is set less than or equal to one-third of that of the air gaps G2 or the air gaps G3 in the through-hole lengthwise direction Z.

The pitch P1 between a respective adjacent two of the turns of the spring intermediate section 41 is set smaller than the pitch P2 of the spring base section 42 (see FIG. 4) and the pitch P3 of the spring head section 43 (see FIG. 5). The pitch P1 is larger than the diameter D10 of the conductor of the spring 4. Other arrangements are identical with those in the first embodiment, and explanation thereof in detail will be omitted here. In the second and following embodiments, the same reference numbers as those in the first embodiment will refer to the same parts unless otherwise specified.

The structure of the second embodiment offers substantially the same beneficial advantages as those in the first embodiment.

Third Embodiment

Figure 11:
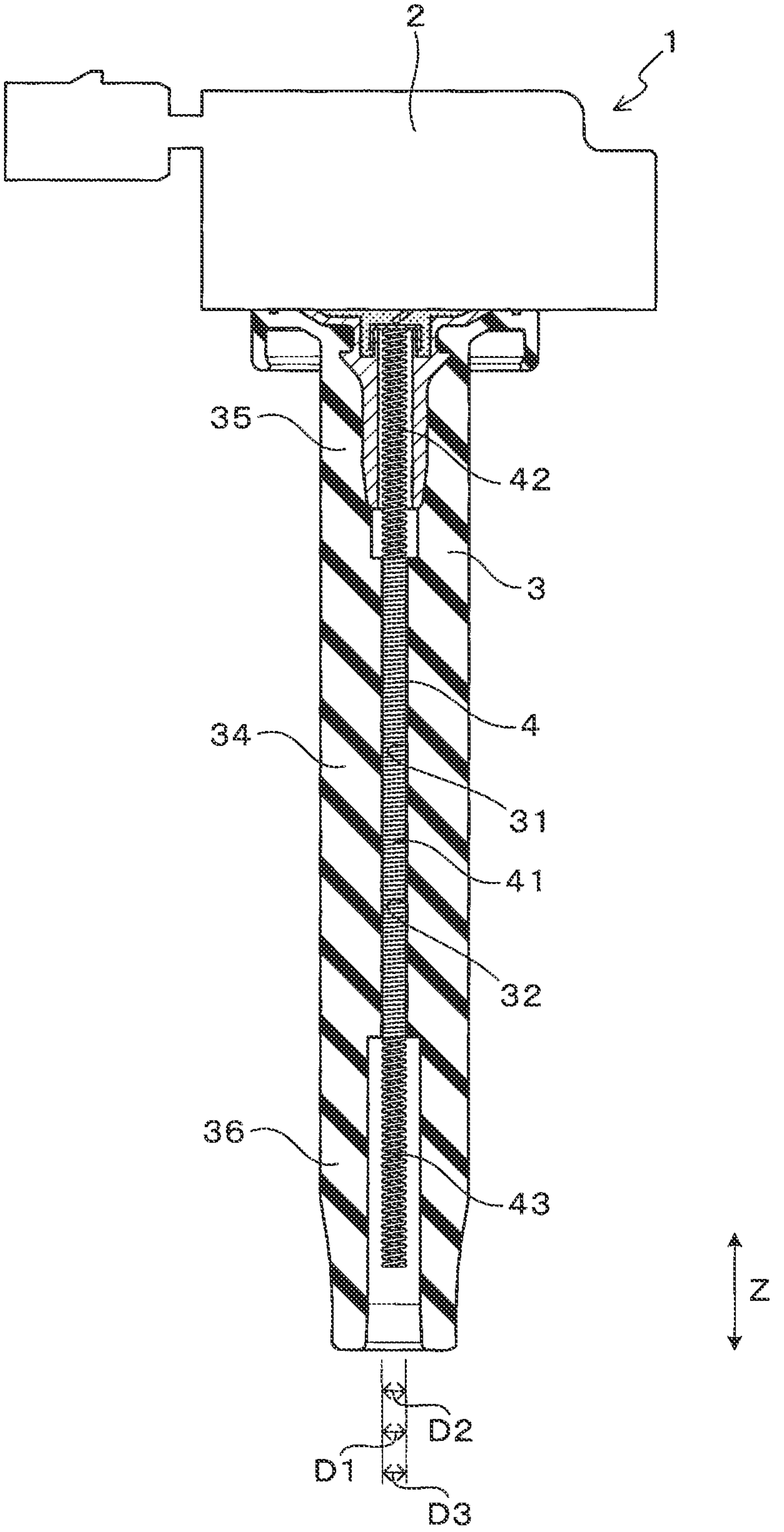
FIG. 11 is a sectional view of an ignition coil, as taken in a through-hole lengthwise direction according to the third embodiment.

This embodiment is, as illustrated in FIG. 11, different in structure or configuration of the spring 4 from the first embodiment. For the sake of convenience, FIG. 11 omits details of a portion of the coil unit 2 which is located closer to the base side than the joint 3 is.

The spring intermediate section 41, as can be seen in FIG. 11, has the outer diameter D1 which is identical with the outer diameter D2 of the spring base section 42 and the outer diameter D3 of the spring head section 43.

The inner diameter of the connecting intermediate section 34 of the joint 3 before the spring 4 is inserted into the through-hole 31 is smaller than those of the connecting base section 35 and the connecting head section 36.

Other arrangements are identical with those in the first embodiment.

The spring 4 is designed to have the outer diameters D1, D2, and D3 which are equal to each other, thereby facilitating the production of the spring 4. This enhances the improvement of productivity of the ignition coil 1.

The structure of the second embodiment also offers substantially the same beneficial advantages as those in the first embodiment.

While the preferred embodiments have been disclosed in order to facilitate better understanding of the invention, it should be appreciated that the invention can be embodied in various ways without departing from the principle of the invention.

What is claimed is:

1. An ignition coil for an internal combustion engine comprising:

a coil unit which works to generate a high voltage;

a cylindrical joint which achieves a mechanical joint of the coil unit and a spark plug and has a through-hole formed therein; and a spring which is disposed inside the through-hole of the joint and achieves an electrical connection of the coil unit and the spark plug, wherein the joint has electrical insulation and elasticity, the spring has a length which extends in a through-hole lengthwise direction of the through-hole and includes a spring base section, a spring head section, and a spring intermediate section located between the spring base section and the spring head section, the spring base section lying on a base side of the length of the spring and electrically connecting with the coil unit, the spring head section lying on a head side of the length of the spring opposed to the base side in the through-hole lengthwise direction and electrically connecting with the spark plug, the joint has an inner peripheral surface placed in direct contact with the spring intermediate section in a radial direction thereof, the spring is made of a spiral winding of a conductor and has the spring intermediate section wound more densely than each of the spring base section and the spring head section when the spring is subjected to no load, and the spring intermediate section has a length in the through-hole lengthwise direction which is larger than a sum of a length of the spring base section in the through-hole lengthwise direction and a length of the spring head section in the through-hole lengthwise direction.

2. The ignition coil as set forth in claim 1, wherein the spring base section and the spring head section are shaped to be symmetric with respect to a center of the length of the spring when the spring subjected to no load is viewed in a direction perpendicular to the through-hole lengthwise direction.

3. The ignition coil as set forth in claim 1, wherein the spring intermediate section has an outer diameter which is larger than an outer diameter of the spring base section and an outer diameter of the spring head section.

4. The ignition coil as set forth in claim 3, wherein the joint is equipped with a positioner which is implemented by an annular protrusion which is formed on the inner peripheral surface and extends in a circumferential direction of the inner peripheral surface, the positioner having an inner diameter which is smaller than an outer diameter of the spring intermediate section and larger than an outer diameter of the spring head section, the spring head section being disposed inside the positioner.

5. An ignition device comprising:

a spark plug; and an ignition coil working to apply a high voltage to the spark plug, wherein the ignition coil includes a coil unit, a cylindrical joint, and a spring, the coil unit working to generate the high voltage, the joint connecting the coil unit and the spark plug together, the spring being disposed inside a through-hole formed in the joint and electrically connecting the coil unit and the spark plug together, the joint has electrical insulation and elasticity, the spring has a length which extends in a through-hole lengthwise direction of the through-hole and includes a spring base section, a spring head section, and a spring intermediate section located between the spring base section and the spring head section, the spring base section lying on a base side of the length of the spring and electrically connecting with the coil unit, the spring head section lying on a head side of the length of the spring opposed to the base side in the through-hole lengthwise direction and electrically connecting with the spark plug, the joint has an inner peripheral surface placed in direct contact with the spring intermediate section in a radial direction thereof, and the spring is made of a spiral winding of a conductor and has the spring intermediate section wound more densely than each of the spring base section and the spring head section when the spring is subjected to no load, and the spring intermediate section has a length in the through-hole lengthwise direction which is larger than sum of a length of the spring base section in the through-hole lengthwise direction and a length of the spring head section in the through-hole lengthwise direction.

6. The ignition device as set forth in claim 5, wherein the spring base section and the spring head section are shaped to be symmetric with respect to a center of the length of the spring when the spring subjected to no load is viewed in a direction perpendicular to the through-hole lengthwise direction.

7. The ignition device as set forth in claim 5, wherein the spring intermediate section has an outer diameter which is larger than an outer diameter of the spring base section and an outer diameter of the spring head section.

8. The ignition device as set forth in claim 7, wherein the joint is equipped with a positioner which is implemented by an annular protrusion which is formed on the inner peripheral surface of the joint and extends in a circumferential direction of the inner peripheral surface, the positioner having an inner diameter which is smaller than an outer diameter of the spring intermediate section and larger than an outer diameter of the spring head section, the spring head section being disposed inside the positioner.

* * * * *